(12) United States Patent
Ihde et al.

(10) Patent No.: US 9,142,909 B2
(45) Date of Patent: Sep. 22, 2015

(54) WELD CONNECTION PROTECTOR CAP

(71) Applicant: Illinois Tool Works Inc., Glenview, IL (US)

(72) Inventors: Jeffery R. Ihde, Greenville, WI (US); Thomas D. Lahti, Combined Locks, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 177 days.

(21) Appl. No.: 13/742,795

(22) Filed: Jan. 16, 2013

(65) Prior Publication Data

US 2014/0199878 A1    Jul. 17, 2014

(51) Int. Cl.
| H01R 13/44 | (2006.01) |
| H01R 13/52 | (2006.01) |
| B23K 9/32 | (2006.01) |
| H01R 9/11 | (2006.01) |

(52) U.S. Cl.
CPC ............ H01R 13/5213 (2013.01); B23K 9/32 (2013.01); H01R 9/11 (2013.01)

(58) Field of Classification Search
USPC .................................................. 439/135, 148
IPC .............. H01R 13/447,13/60, 13/5213, 13/443, H01R 23/025; H05K 7/1053, 7/1007
See application file for complete search history.

(56) References Cited

U.S. PATENT DOCUMENTS

| 3,120,987 | A | * | 2/1964 | Degnan et al. | 439/588 |
| 3,129,993 | A | | 4/1964 | Ross | |
| 4,421,369 | A | | 12/1983 | Myking | |
| 4,707,043 | A | * | 11/1987 | Reed | 439/142 |
| 5,006,078 | A | * | 4/1991 | Crandall et al. | 439/521 |
| 5,630,419 | A | * | 5/1997 | Ranalletta | 600/459 |
| 6,056,599 | A | | 5/2000 | Flickinger | |
| 6,250,955 | B1 | | 6/2001 | Archuleta | |
| 6,402,533 | B1 | * | 6/2002 | Fan Wong | 439/135 |
| 7,442,077 | B2 | * | 10/2008 | Peress et al. | 439/505 |
| 7,470,858 | B2 | * | 12/2008 | McNutt et al. | 174/67 |
| 2011/0244713 | A1 | | 10/2011 | Ihde | |

OTHER PUBLICATIONS

International Search Report from PCT application No. PCT/US2014/011356, dated Jul. 7, 2014, 11 pgs.

* cited by examiner

*Primary Examiner* — Hien Vu
(74) *Attorney, Agent, or Firm* — Fletcher Yoder P.C.

(57) ABSTRACT

A weld cable connector system that includes a first terminal and a terminal protection system. The first terminal includes a first lock feature. The first terminal is configured to couple with a welding component and to conduct a welding power. The terminal protection system includes a cap, a base coupled to the first terminal, and a tether coupled to the base and to the cap. The cap includes a first mating lock feature. The cap is configured to removably couple with the first terminal in a first locking position to separate the first terminal from an external environment. The first mating lock feature is configured to interface with the first lock feature.

12 Claims, 4 Drawing Sheets

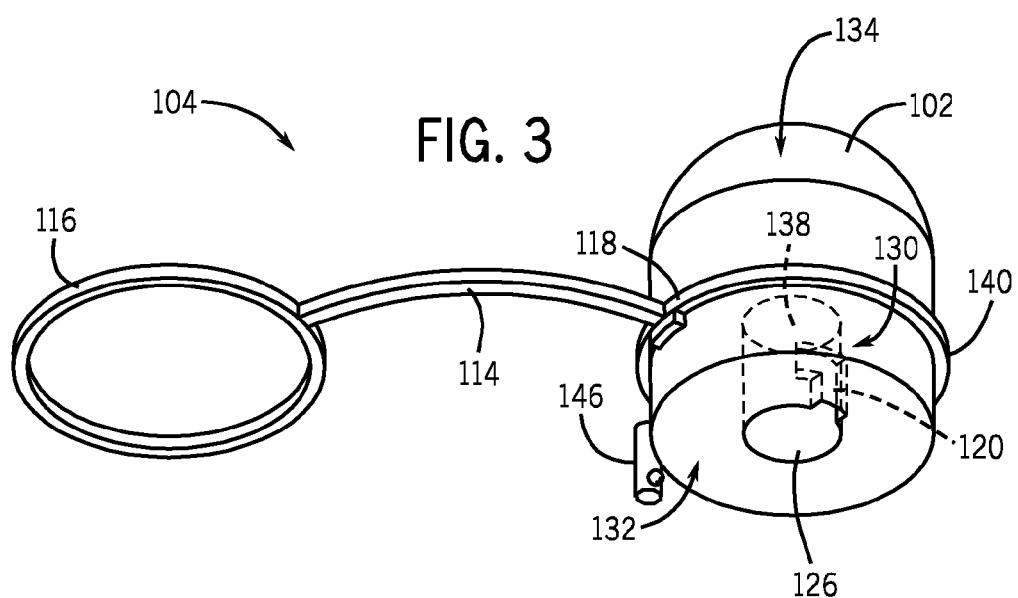
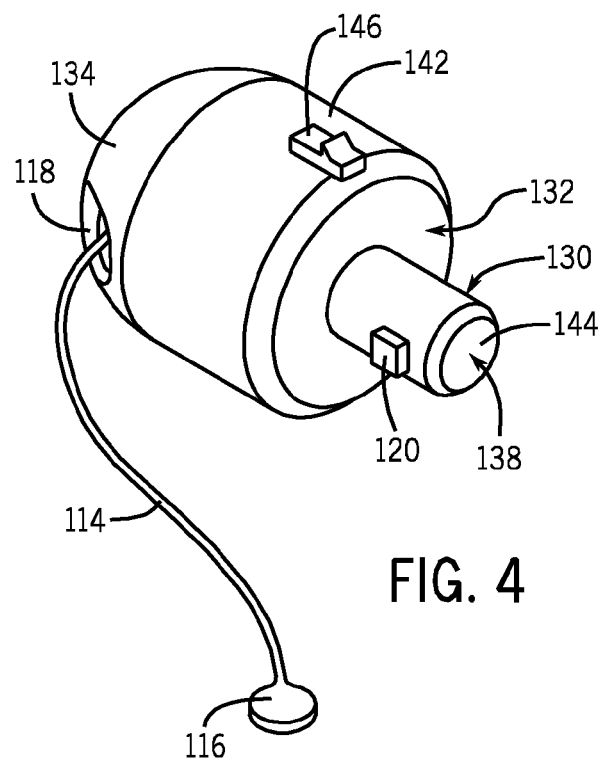

# WELD CONNECTION PROTECTOR CAP

BACKGROUND

The invention relates generally to welding systems, and more particularly, to a weld connection protector cap.

Welding is a process that has become increasingly ubiquitous in various industries and applications. While such processes may be automated in certain contexts, a large number of applications continue to exist for manual welding operations. Such welding operations rely on a variety of types of equipment to perform welding process such as metal inert gas (MIG), shielded metal arc welding (SMAW or stick welding), or tungsten inert gas (TIG). Welding power sources used in such applications are designed to provide power for welding, while wire feeders are used to deliver welding wire to a welding torch. Weld cables connect welding power sources to wire feeders, and connect wire feeders to welding torches. Weld cables conduct power from the welding power source to the work piece. The weld cables interface with terminals to transfer power between the component and the weld cable. The terminals of the weld cable and the component may have mating geometries. Weld cables are frequently removed and transported from one work site to another. Unfortunately, damage to the terminals, such as during transport or storage, may affect the transmission of weld power between the weld cable and the component.

BRIEF DESCRIPTION

The present invention provides a weld cable connector system that includes a first terminal and a terminal protection system. The first terminal includes a first lock feature. The first terminal is configured to couple with a welding component and to conduct a welding power. The terminal protection system includes a cap, a base coupled to the first terminal, and a tether coupled to the base and to the cap. The cap includes a first mating lock feature. The cap is configured to removably couple with the first terminal in a first locking position to separate the first terminal from an external environment. The first mating lock feature is configured to interface with the first lock feature.

Another embodiment provides a weld cable terminal protection system with a cap, a base, and a tether coupled to the base and to the cap. The cap includes a first mating lock feature configured to mate with a first lock feature of a first terminal of a weld cable. The first mating lock feature is configured to mate by a twist-lock structure to mechanically retain the cap mated with the first terminal.

Another embodiment provides weld cable connector system that includes a weld cable and a terminal protection system. The weld cable includes an end portion with a first terminal having a first lock feature. The first terminal is configured to removably couple the weld cable to a welding component and to conduct a welding power with the welding component. The terminal protection system includes a cap, a base coupled to the first terminal, and a tether coupled to the base and to the cap. The cap includes a first mating lock feature. The cap is configured to receive the terminal and to removably couple with the first terminal in a first locking position by a twist-lock structure to mechanically retain the cap mated with the terminal. The cap includes an insulating material configured to separate the first terminal from an external environment in the first locking position. The tether is configured to lie adjacent to the end portion in the first locking position.

DRAWINGS

These and other features, aspects, and advantages of the present invention will become better understood when the following detailed description is read with reference to the accompanying drawings in which like characters represent like parts throughout the drawings, wherein:

FIG. 3 is a perspective view of an embodiment of a receptacle-type cap;

FIG. 4 is a perspective view of an embodiment of a plug-type cap; and

DETAILED DESCRIPTION

As described in detail below, embodiments of weld connection protection cap are provided that may facilitate fewer components and simplified construction. For example, in certain embodiments a cap, a tether, and a base are separate components of different materials, while in other embodiments the cap may be integral with the tether and the base, and of the same materials. In either case, the cap mates with the terminal to protect the terminal from an external environment.

Figure 1:
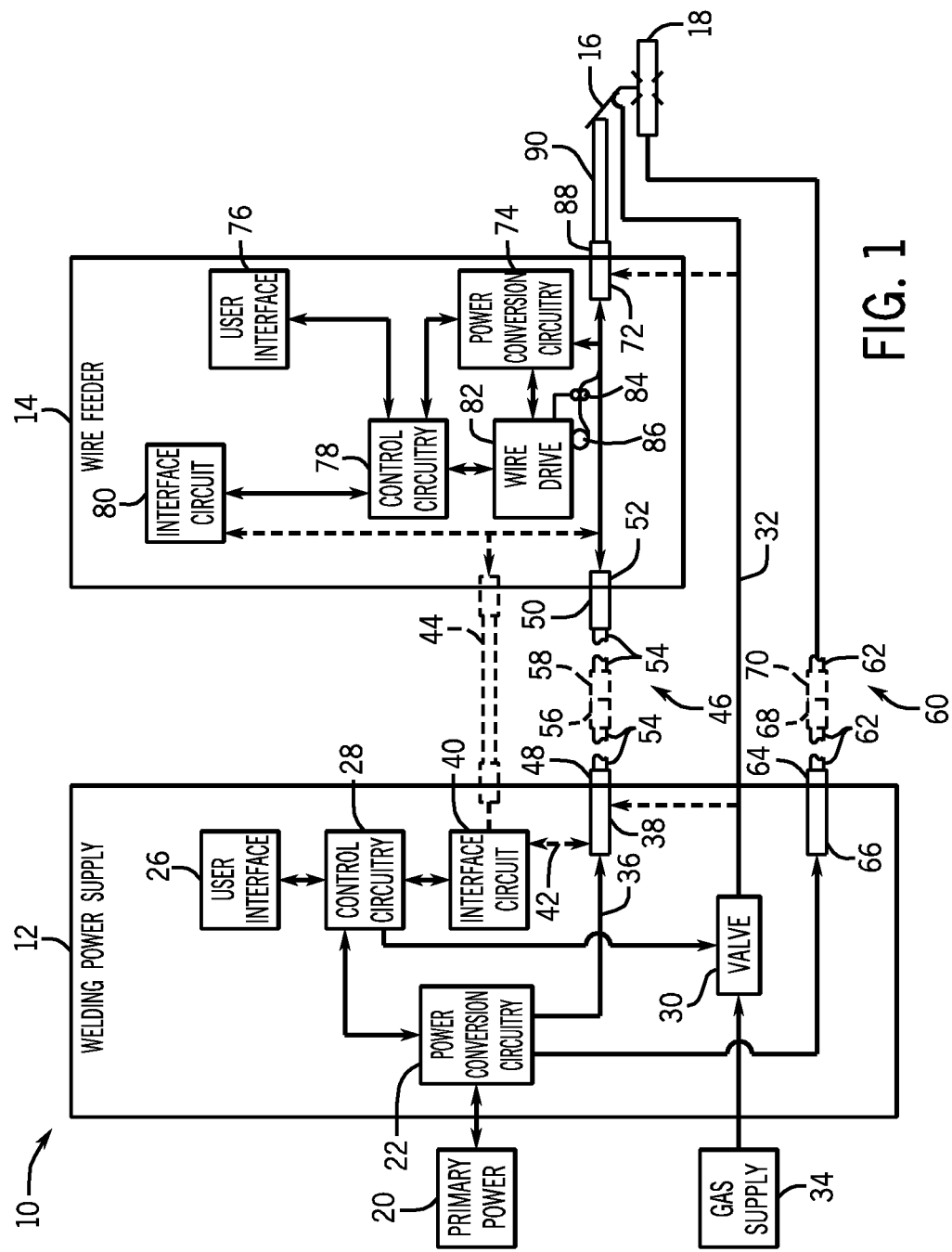
FIG. 1 is a schematic diagram of a welding system in accordance with aspects of the present disclosure.

Turning now to the figures, FIG. 1 is a schematic diagram of an exemplary welding system 10 which powers, controls, and provides supplies to a welding operation. The welding system 10 includes a welding power supply 12, a wire feeder 14, a torch 16, and a workpiece 18. The welding power supply 12 receives primary power 20 (e.g., from the AC power grid, an engine/generator set, a battery, or a combination thereof), conditions the input power, and provides an output power to one or more welding devices in accordance with demands of the system 10. The primary power 20 may be supplied from an offsite location (i.e., the primary power may originate from a wall outlet). The welding power source 12 includes power conversion circuitry 22 that may include circuit elements such as transformers, rectifiers, switches, and so forth, capable of converting the AC input power to a DCEP or DCEN output as dictated by the demands of the system 10. Such circuits are generally known in the art. It should be noted, however, that the weld cable terminals disclosed herein may be used with any desired welding application or process that relies on the provision of power through a weld cable. The terminal protection system described below mates with weld cable terminals to protect the terminals when not in use. This might include, for example, AC welding processes, DC welding processes, pulsed and short circuit welding processes, hybrid processes, and so forth. The weld cable may provide power for use in a shielded metal arc welding (SMAW or stick welding) process, a metal inert gas (MIG) or a gas metal arc welding (GMAW) process, a tungsten inert gas (TIG) welding process, a plasma cutting process, and so forth. Moreover, the cabling may be used for such processes and may channel power for processes that do not utilize shielding gas, but may also be used when other processes are employed that do require shielding gas.

In some embodiments, the power conversion circuitry 22 converts the primary power to both weld and auxiliary power outputs. However, in other embodiments, the power conversion circuitry 22 is adapted to convert primary power only to a weld power output, and a separate auxiliary converter may be provided to convert primary power to auxiliary power. Still further, in some embodiments, the welding power supply 12 is adapted to receive a converted auxiliary power output directly from a wall outlet. Indeed, any suitable power conversion system or mechanism may be employed by the welding power supply 12 to generate and supply both weld and auxiliary power.

The welding power supply 12 includes a user interface 26 and control circuitry 28. The control circuitry 28 controls the operations of the welding power supply 12 and may receive input from the user interface 26 through which a user may choose a process, and input desired parameters (e.g., voltages, currents, particular pulsed or non-pulsed welding regimes, and so forth). The control circuitry 28 may also be configured to receive and process a plurality of inputs regarding the performance and demands of the system 10. Furthermore, the control circuitry 28 may include volatile or non-volatile memory, such as ROM, RAM, magnetic storage memory, optical storage memory, or a combination thereof. In addition, a variety of control parameters may be stored in the memory along with code configured to provide a specific output (e.g., initiate wire feed, enable gas flow, etc.) during operation.

The welding power supply 12 may also include a valve 30 to modulate the amount of gas supplied to a welding operation through a cable 32. The valve 30 operates with signals from the control circuitry 28. A gas supply 34 may provide shielding gases, such as argon, helium, carbon dioxide, and so forth. The gas enters valve 30 then exits the valve through cable 32. The cable 32 directs the gas to the torch 16. In some embodiments, the cable 32 may direct the gas to the connector 38 of the welding power supply 12 or to a connector 60 in the wire feeder 14. The cable 36 supplies the wire feeder 14 and the torch 16 with power from the power conversion circuitry 22. For example, for a stick or a TIG welding process, the welding power supply 12 may supply power along the cable 36 directly to the torch 16. In a MIG welding process, the welding power supply 12 may supply at least power along the cable 36 to the wire feeder 14. The cable 36 is coupled to connector 38. The connector 38 is a female box mount connector with a receptacle that is mounted to the welding power supply 12. In certain embodiments, the connector 38 may be a male box mount connector with a plug, or the connector 38 may be any connector that enables transmission of power therethrough. For example, the connector 38 may be of a twist-lock type. As may be appreciated, different geometries of twist-lock type connectors may be utilized based on the connection terminals of the system 10. Geometries of twist-lock type connectors include, but are not limited to Dinse-style or Tweco-style connectors of the male or female variety. While the terms Dinse-style and Tweco-style are discussed below, presently contemplated embodiments may be utilized to protect the terminals of the system 10 with other geometries.

Data is communicated between the control circuitry 28 and an interface circuit 40. The interface circuit 40 conditions the data from the control circuitry 28 for communication to other welding devices, such as a wire feeder 14 or a pendant. The interface circuit 40 may be connected to connector 38 for transmission of data combined with the power. In another embodiment, data conditioned in the welding power supply 12 is communicated to the wire feeder 14 over a control cable assembly 44. Certain power signals may also be transmitted over the control cable assembly 44.

A first cable assembly 46 connects the welding power supply 12 to the wire feeder 14 or to the torch 16. A male connector terminal 48 is coupled to connector 38 on the power supply 12 and a female connector terminal 50 is coupled to a male box mount connector 52 on the wire feeder 14. In certain embodiments, the connector 52 is a female box mounted connector, or connector 52 may be another type of connector. Furthermore, in other embodiments, the connector terminals 48 and 50 may be male or female terminals such that connector terminals 48 and 50 mate with connectors 38 and 52 respectively. The first cable assembly 46 includes a weld cable 54 coupled to connector terminals 48 and 50. In addition, the first cable assembly 46 may include multiple cables weld cables 54, such that the first cable assembly 46 includes connector terminal 56 of a first weld cable and connector terminal 58 of a second weld cable. For example, a male connector terminal 56 may mate with a female connector terminal 58 to electrically couple two weld cables 54. A second cable assembly 60 connects the workpiece 18 to the welding power supply 12. One or more work cables 62 provide a return path for welding power from the workpiece 18. A male connector terminal 64 is coupled to a female connector 66 on the power supply 12, and the work cable 62 is coupled to the workpiece 18 (e.g., via a clamp). In some embodiments, the connector 66 is a male box mounted connector or another type of connector. In addition, the second cable assembly 60 may include multiple work cables 62, such that the assembly may include connector terminals 68 and 70. In some embodiments, the work cable 62 is substantially the same as the weld cable 54 so that the respective connections of the work cable 62 and the weld cable 54 may be switched. For example, the work cable 62 may be coupled to the wire feeder 14 or torch 16, and the weld cable 54 may be coupled to the workpiece 18. Accordingly, the description herein of the weld cable 54 also applies to the work cable 62. The weld cables 54 and work cables 62 are types of power cables.

Power runs along the weld cable 54 between the connector 52 and a female box mount connector 72 across the connector terminals 48 and 50. Again, the connector 72 may be a male box mount connector, or any other connector that can carry power. Power conversion circuitry 74 is powered from the weld cable 54. The wire feeder 14 also includes a user interface 76 and control circuitry 78. The power conversion circuitry 74 powers the control circuitry 78. The control circuitry 78 functions similar to control circuitry 28, but controls the functionality of the wire feeder 14. The control circuitry 78 may receive input from the user interface 76 through which a user may input desired parameters (e.g., voltages, currents, wire speed, and so forth). Further, an interface circuit 80 may receive signals from control circuitry 78 for transmission to the welding power supply 12. Conditioned data is received by the wire feeder 14 and converted by the interface circuit 80 to signals compatible with the control circuitry 78. The interface circuit 80 may receive conditioned data either through cable 44, or through cable assembly 46 as illustrated. The wire feeder 14 also includes a wire drive 82 that receives control signals from the control circuit 78 to drive rollers 84 that cause wire to be fed from a wire spool 86 to the torch 16. Power and gas are transferred out of the wire feeder 14 through connector 72. A male connector terminal 88 coupled to a weld cable 90 enables power to be provided to the torch 16 for a welding operation. In certain embodiments, the connector terminal 88 is a female connector terminal.

While FIG. 1 illustrates an embodiment of a welding system 10 with a wire feeder 14 for a MIG welding process, the wire feeder 14 may be omitted in some embodiments, enabling the power cables (e.g., weld cables 54 and work cables 62) to be coupled directly from the welding power supply 12 to the torch 16 and the workpiece 18, such as for stick or TIG welding processes. Moreover, the torch 16 may be a plasma cutting torch for a plasma cutting process.

Figure 2:
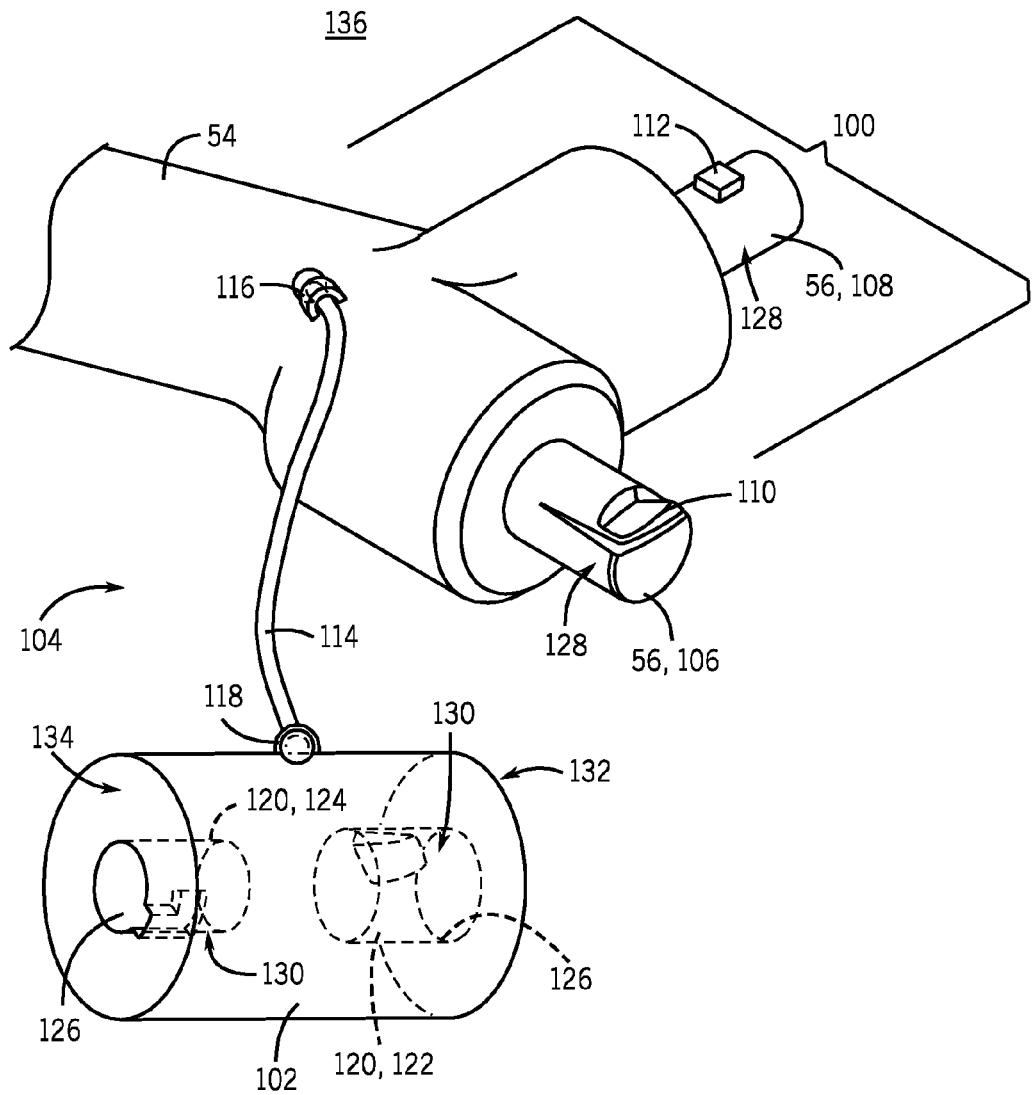
FIG. 2 is a perspective view of an embodiment of a weld cable with a Y-shape end portion and a terminal protection system in accordance with aspects of the present disclosure.

FIG. 2 illustrates a perspective view of an embodiment of a weld cable 54 with a Y-shape end portion 100 coupled to a cap 102 of a terminal protection system 104. The end portion 100 is approximately 1, 5, 10, 15, or 20% of the weld cable 54 proximate to the terminal 56. The Y-shape end portion 100 has two connector terminals 56 with the same or different terminal geometries. Each terminal 56 forms the end of the weld cable 54 through which power is conducted to another weld cable 54 or a weld component. A weld cable 54 with two or more terminals may enable the weld cable 54 to couple with multiple weld components (e.g., wire feeder 14, torch 16, workpiece 18) simultaneously or with weld components having different connectors. For example, a first terminal 106 may be a first twist-lock type terminal, such as a Tweco-style terminal, and a second terminal 108 may be a second twist-lock type terminal, such as a Dinse-style terminal. In some embodiments, the first terminal 106 and the second terminal 108 may the same style terminal (e.g., Tweco, Dinse, etc.), but the first terminal 106 and the second terminal 108 may have different genders (e.g., male plug, female receptacle). The first terminal 106 has a first lock feature 110 (e.g., groove, notch) and the second terminal 108 has a second lock feature 112 (e.g., protrusion). Other embodiments of the first lock feature 110 and/or the second lock feature 112 may have different geometries than those illustrated in FIG. 2.

Figure 5:
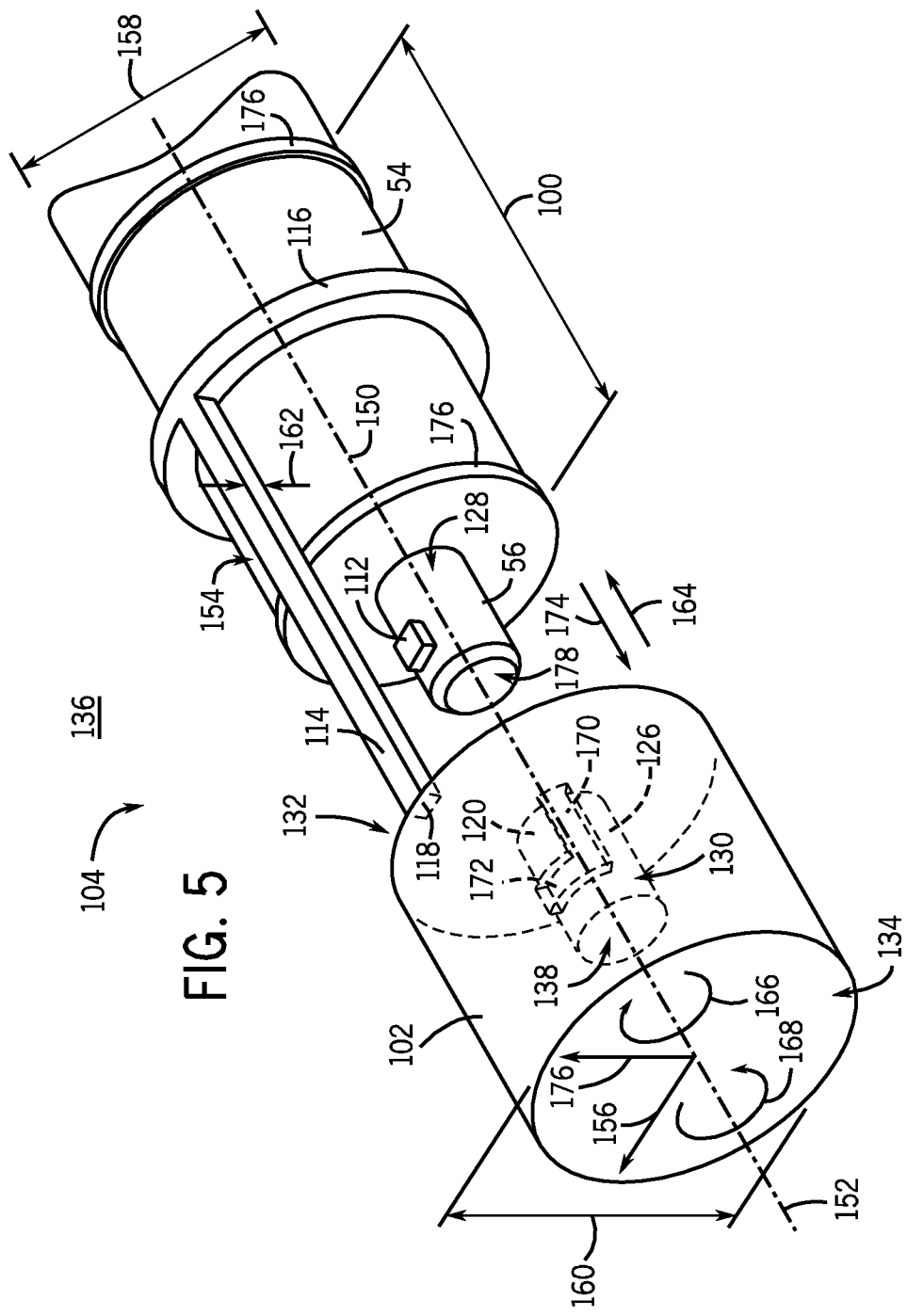
FIG. 5 is a perspective view of an embodiment of a weld cable end portion and the terminal protection system.

The end portion 100 is coupled to the cap 102 of the terminal protection system 104 by a tether 114. The tether 114 is coupled to a base 116 of the end portion 100 and an attachment point 118 of the cap 102. The base 116 may be integrally formed with the end portion 100, such as the eye enclosure base shown in FIG. 2. In some embodiments, the base 116 is separate from the end portion 100, such as a hoop that at least partially encircles the end portion 100, as shown in FIG. 5. In some embodiments, the tether 114 is looped around the end portion 100 to form the base 116 of the terminal protection system 104 that retains the cap 102 coupled to the end portion 100. The tether 114 may be coupled to the cap 102 by a variety of structures, such as an eye enclosure base 116 of the cap 102 as shown in FIG. 2. In some embodiments, the tether 114 is integrally formed with the cap 102, as shown in FIG. 5. In other embodiments, the tether 114 at least partially encircles the cap 102, as shown in FIG. 3. Accordingly, the terminal protection system 104 is made of one or more components coupled to the end portion 100.

The cap 102 has at least one mating lock feature 120 that interfaces with the first terminal 106 and/or the second terminal 108. In some embodiments, the cap 102 has a first mating lock feature 122 that enables the cap 102 to mate with the first terminal 106 and the first lock feature 110 in a first locking position, and a second mating lock feature 124 that enables the cap 102 to mate with the second terminal 108 and the second lock feature 112 in a second locking position. In embodiments with male terminals 56, as shown in FIG. 2, the mating lock features 120 are within receptacles 126. Presently contemplated embodiments also include female receptacle terminals and male plugs of the cap that are inserted into the receptacles. The term "mating" as used herein, is to be defined as interfacing two components so that most of a male surface of a first component (e.g., first terminal 106) interfaces with most of a female surface of a second component (e.g., first mating lock feature 122). That is, the first terminal 106 and the first mating lock feature 110 are mating components because most of a terminal surface 128 of the first terminal 106 interfaces with most of a cap surface 130 of the first mating lock feature 122 in the first locking position. Accordingly, the first terminal 106 and the first mating lock feature 122 are substantially complementary. The second terminal 108 and the second mating lock feature 112 have a similar complementary relationship between the respective terminal surface 128 and the cap surface 130.

In some embodiments, the first mating lock feature 122 is on a first face 132 of the cap 102 and the second mating lock feature 124 is on a second opposing face 134 of the cap 102. In some embodiments, the cap 102 may mate with the first terminal 106, the second terminal 108, or neither terminal, such as when both terminals are coupled to weld components or weld cables 54. In some embodiments, the cap 102 may mate with the first terminal 106 and the second terminal 108 simultaneously. At times when the cap 102 is not mating with a terminal 56, the tether 114 retains the cap 102 coupled to the weld cable 54 so that the cap 102 is readily available for use. The complementary interface between the mating lock features of the cap 102 and the lock features of the terminals 56 enables the cap 102 to protect the terminals 56 from the external environment 136.

The lock features of the terminals 56 enable the weld cable 54 to be coupled to weld components, such as the welding power supply, the wire feeder, the torch, and so forth. Each lock feature may have a particular geometry to enable the terminal 56 to properly interface with the weld component and to conduct power efficiently through the interface. Forces and/or process in the external environment 136 may alter the geometry of an exposed terminal. An exposed terminal is a terminal that is not coupled with the cap 102 or a weld component. Forces and processes that may alter the geometry of the exposed terminal include, but are not limited to impact (e.g., from dropping the exposed terminal), sustained loads (e.g., from twisting, pulling, or compressing the exposed terminal), abrasion (e.g., from dragging the exposed terminal), corrosion (e.g., from exposure to chemicals), or oxidation, or any combination thereof. For example, an exposed terminal of a weld cable without the terminal protection system may be exposed to these forces and/or processes during storage or transport of the weld cable. Accordingly, the cap 102 mated to the terminal 56 may isolate substantially all, or at least a portion, of the terminal 56 from the external environment 136. The cap 102 protects the terminal 56 at least in part from forces and processes that may otherwise alter the geometry of the terminal 56 during storage and/or transport of the weld cable 54. The cap 102 may be an insulator that insulates the terminal 56 when mated.

FIG. 3 illustrates a perspective view of an embodiment of the terminal protection system 104 with a female receptacle-type cap 102 and one mating feature 120. In the illustrated embodiment, the receptacle 126 is through the first face 132, and the opposing second face 134 encloses an end 138 of the receptacle 126. In some embodiments, the mating lock feature 120 interfaces with a twist-lock structure of the terminal to retain the cap 102. The weld cable may be transported (e.g., weaved) through passages prior to coupling the terminal with a weld component. A rounded second face 134, as illustrated in FIG. 3, enables the weld cable with the terminal mated with the mating feature 120 to be readily threaded through passages without snagging the cap 102 on the passages, data cables, or other items. That is, the geometry of the second face 134 may affect the likelihood of the terminal protection system 104 snagging on items while in transport. The second face 134 may have a domed, rounded or conical geometry that reduces the likelihood of snagging.

In some embodiments, the tether 114 is integrally formed with base 116 and/or the cap 102. In the illustrated embodiment, the tether 114 is integrally formed with the base 116. The tether 114 forms a loop 140 coupled to the cap 102 at the attachment point 118. Components (e.g., the cap 102, the tether 114, the base 116) of the terminal protection system 104 may be made of an insulator, such as elastomer (e.g., rubber), one or more plastics (e.g., Xenoy®, thermoplastic, polybutylene terephthalate (PBT), polyethylene terephthalate (PET), polycarbonate), wood, ceramic, or any combination thereof. A Xenoy® plastic may be available from SABIC of Pittsfield, Mass. The components may be formed by injection molding, compression molding, over-molding or another process. In some embodiments, the mating lock feature 120 is formed of a metal (e.g., copper, steel, aluminum), and an insulator (e.g., plastic, rubber) is formed, layered, or molded about the metal to insulate the terminal from the external environment. The metal mating lock feature 120 may be more durable than a plastic mating lock feature 120. For example, the cap 102 may be an injection molded xenoy material, and the tether 114 and integral base 116 may be cut or stamped from a rubber or plastic sheet. In some embodiments, the tether 114 is a metal cable, metal tie, or plastic tie coupled between the cap 102 and the base 116.

FIG. 4 illustrates a perspective view of an embodiment of the terminal protection system 104 with a male plug-type cap 142 and mating lock feature 120. The male plug-type cap 142 may be made by similar processes and made of the same materials as the female receptacle-type cap of FIG. 3. The plug-type cap 142 has a plug 144 extending from the first face 132. The plug 144 is to be inserted within a receptacle-type terminal of a weld component to protect the terminal. In some embodiments, the mating lock feature 120 interfaces with a twist-lock structure of the receptacle-type terminal to retain the cap 102. FIG. 4 illustrates an alternative attachment point 118 of the cap 102 on the opposing second face 134, and illustrates a cable as the tether 114.

In some embodiments, the male plug-type cap 142 fastens to the weld cable 54 by an outer locking feature 146. The outer locking feature 146 may include, but is not limited to a snap, a ball detent, or a cotter pin. The outer locking feature 146 may interface with a mating outer locking feature (e.g., loop, recess, hole) on the weld cable 54 to retain the cap male plug-type cap 142. In this way, the outer locking feature 146 may be complementary and/or an alternative to a twist-lock structure of the receptacle-type terminal and male plug-type cap 142. Moreover, some embodiments of the female receptacle-type cap 102 of FIG. 3 may have the outer locking feature 146.

FIG. 5 illustrates a perspective view of an embodiment of the end portion 100 of the weld cable 54 and the terminal protection system 104. The terminal 56 extends through the weld cable 54 along a cable axis 150. The cap 102 extends along a cap axis 152, and the receptacle 126 may be centered along the cap axis 152. In some embodiments, the tether 114 is integrally formed with the base 116 and the cap 102. The tether 114 extends along the cable axis 150 from the base 116 and lies along (e.g., flush with) the outer surface 154 of the end portion 100. In some embodiments, when the mating lock feature 120 of the cap 102 mates with the terminal 56, approximately 50, 60, 70, 80, 90, or 100% of the tether 114 may lie along the outer surface 154 of the end portion 100. Portions of the tether 114 that lie along the outer surface 154 of the end portion 100 when the cap 102 is mated to the terminal 56 are less likely to snag or catch on cables, corners, hooks, and other items when moving the weld cable 54 than portions of the tether 114 that are spaced from the outer surface 154 in the radial direction 156 from the cap axis 152. Mating the cap 102 and the terminal 56 aligns the cable axis 150 with the cap axis 152. A cable diameter 158 of the weld cable 54 may be approximately the same as a cap diameter 160. In some embodiments, the cap diameter 160 is larger than the cable diameter 158 by less than approximately 0.75, 0.50, 0.25, or 0.10 inches, or approximately a thickness 162 of the tether 114 in the radial direction 156.

To mate the mating lock feature 120 with the terminal 56 in the locking position, the cable axis 150 and the cap axis 152 are aligned. The cap 102 is then mounted on the terminal 56 in direction 164 along the cable axis 150. For terminals 56 with a twist-lock structure, the cap 102 is to be twisted in a clockwise direction 166 or a counter-clockwise direction 168 to align the lock feature 112 with the geometry of the mating lock feature 120. For example, FIG. 5 illustrates a male Dinse-style terminal 56 with the protrusion 112 and a female Dinse-style receptacle 126 with a protrusion accommodating channel 170. The cap 102 and/or the weld cable 54 may be twisted about the cable axis 150 to align the protrusion 112 with the channel 170. After interfacing the terminal surface 128 with the cap surface 130, the cap 102 is twisted (e.g., clockwise 166) to secure the protrusion 112 within a locking region 172 of the mating lock feature 120. This positions the cap 102 and the terminal 56 in a locking position that resists separation along the cable axis 150 as indicated by the arrow 174. Accordingly, the mating lock feature 120 couples the cap 102 to the terminal 56 and protects the terminal 56 form the external environment 136. The tether 114 couples the cap 102 to the end portion 100 of the weld cable 54 and retains cap 102 proximate to the terminal 56 when not in use.

The base 116 may be axially and/or tangentially fixed to the end portion 100, as illustrated in FIG. 2. In some embodiments, the base 116 may be adjusted freely along the cable axis 150 and tangentially about the outer surface 154. Lips 176 may set bounds on the axial motion of the base 116. The tether 114 is a flexible material, such as a rubber, to enable the cap 102 to be mated and removed from the terminal 56.

The terminal protection system 104 may be biased about the cable axis 150. For example, the base 116, attachment point 118, lock feature 112, and locking region 172 is aligned along a vertical axis 178, as shown in FIG. 5. The channel 170 is not aligned with the lock feature 112, so the cap 102 and tether 114 are twisted in the counter-clockwise direction 168 to interface an end 180 of the terminal 56 with the end 138 of the receptacle 126. The biased tether 114 twists cap in the clockwise direction 166 to bring the attachment point 118 and locking region 172 in alignment with the vertical axis 178. In some embodiments, the tether 114 is biased along the cable axis 150, such as a spring, so that the tether 114 pulls the cap 102 in the direction 164 to mate the cap 102 with the terminal 56. Presently contemplated embodiments also include biased components of the terminal protection system 104 that retain the cap 102 in a mated connection with the terminal 56 unless manually decoupled by the operator. The biased components of the terminal protection system 104 may improve the retention of the cap 102 to the terminal 56, thus improving the protection of the terminal 56 from the external environment 136.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A weld cable connector system comprising:
    a first terminal comprising a first lock feature thereon, wherein the first terminal extends from a weld cable and is configured to couple with a welding component and to conduct a welding power; and a terminal protection system comprising:
a cap comprising a first mating lock feature, wherein the cap is configured to removably couple with the first terminal in a first locking position, wherein the first mating lock feature is configured to interface with the first lock feature and to separate the first terminal from an external environment in the first locking position;
a base coupled to the weld cable; and
a tether coupled to the base and to the cap.

2. The weld cable connector system of claim 1, wherein the first terminal comprises a male end and the cap comprises a female receptacle configured to receive the male end.

3. The weld cable connector system of claim 1, wherein the first lock feature and the first mating lock feature are configured to mate in the first locking position by a twist-lock structure to mechanically retain the cap mated with the first terminal.

4. The weld cable connector system of claim 1, wherein the first terminal is disposed at an end of the weld cable, and the base is coupled about an end portion of the weld cable proximate to the end.

5. The weld cable connector system of claim 4, wherein the tether is configured to lie along an outer surface the end portion of the weld cable in the first locking position.

6. The weld cable connector system of claim 1, wherein the first terminal comprises an axis, and the terminal protection system is rotationally biased about the axis to retain the cap in the first locking position.

7. The weld cable connector system of claim 1, wherein the cap is integral with the terminal protection system.

8. The weld cable connector system of claim 1, wherein the cap comprises an insulator configured to separate the first terminal from the external environment in the first locking position.

9. A weld cable connector system comprising:
a weld cable comprising an end portion, wherein the end portion comprises a first terminal comprising a first lock feature thereon, wherein the first terminal is configured to removably couple the weld cable to a welding component and to conduct a welding power with the welding component; and
a terminal protection system comprising:
a cap comprising a first mating lock feature, wherein the cap is configured to receive the first terminal and to removably couple with the first terminal in a first locking position by a twist-lock structure to mechanically retain the cap mated with the first terminal;
a base coupled to the weld cable; and
a tether coupled to the base and to the cap;
wherein the cap comprises an insulating material configured to separate the first terminal from an external environment in the first locking position, and the tether is configured to reduce snagging of terminal protection system while in transport.

10. The weld cable connector system of claim 9, wherein the tether is integrally formed with the cap, the base, or any combination thereof.

11. The weld cable connector system of claim 9, wherein the cap comprises a rubber, a plastic, a metal and an insulator, or any combination thereof.

12. The weld cable connector system of claim 9, wherein the first terminal comprises an axis, and the tether is biased about the axis to retain the cap in the first locking position.

* * * * *